Oct. 18, 1966  J. L. WISE  3,279,860

WHEEL COVER ASSEMBLY

Filed Sept. 18, 1964                                    2 Sheets-Sheet 1

INVENTOR.
Jack L. Wise
BY
Harness and Harris
ATTORNEYS.

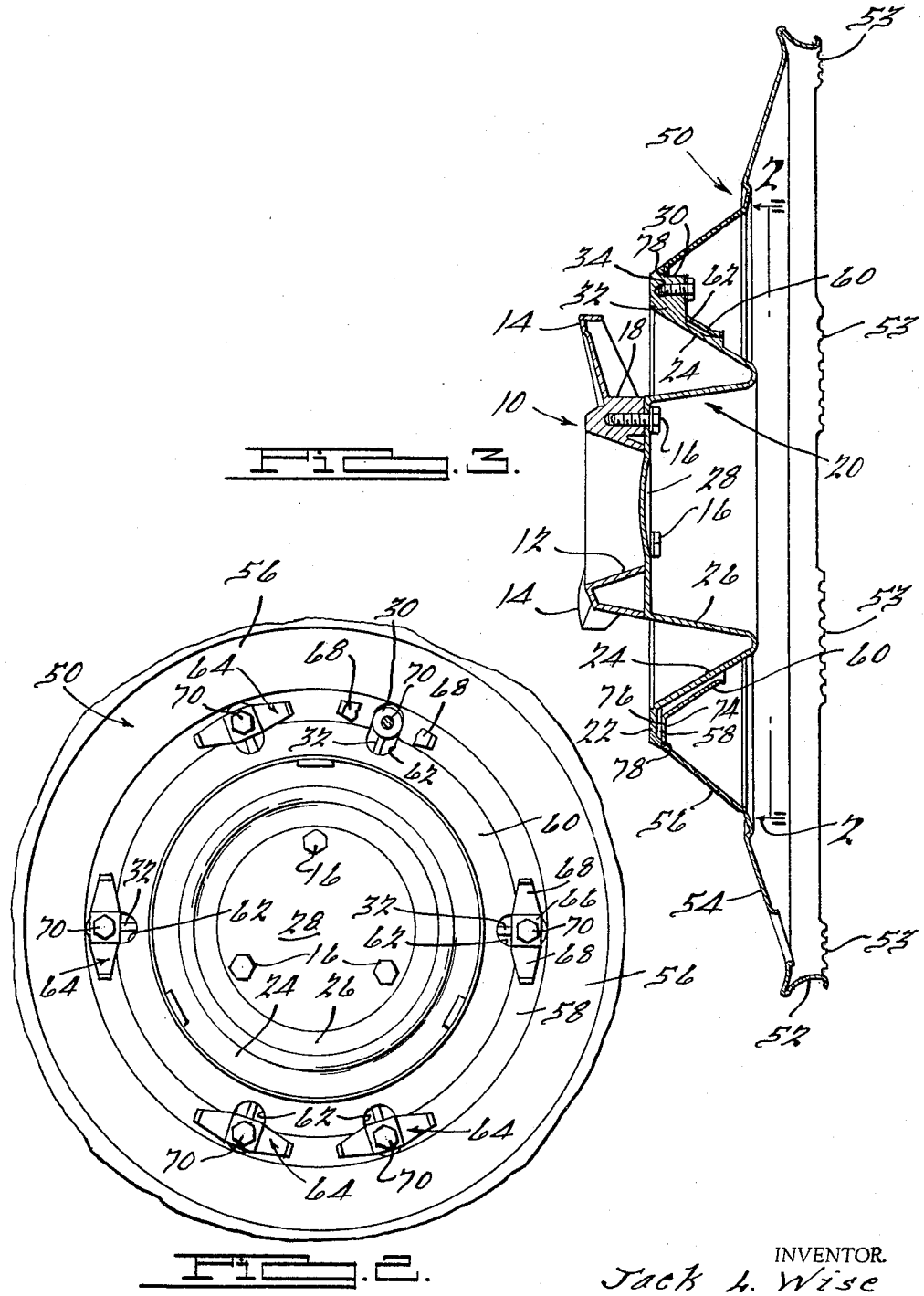

3,279,860
WHEEL COVER ASSEMBLY
Jack L. Wise, Rochester, Mich., assignor to Chrysler Corporation, Highland Park, Mich., a corporation of Delaware
Filed Sept. 18, 1964, Ser. No. 397,414
13 Claims. (Cl. 301—37)

This invention relates to wheel covers and more particularly to wheel covers of the type comprising two or more annular or disk shaped members adapted to be secured together in concentric relationship to form a wheel cover assembly.

It is an object of the present invention to provide, in a wheel cover assembly, a novel arrangement whereby the various annular members may be held together in non-rattling relationship.

It is a more specific object to provide, in a wheel cover assembly, a novel arrangement whereby the various annular members may be held together in non-rattling relationship by means which are not visible at the outer face of the assembly and hence do not detract from the appearance of the assembly.

Another object is to provide, in a wheel cover assembly, a novel arrangement whereby the various annular members may be securely held together while yet maintaining certain delicate exterior dimensions desirable for styling considerations.

A further object is to provide, in a wheel cover assembly, a novel securing arrangement which will enable the same outer annular member to be used with different inner members, whereby to reduce the number of members required to provide the plurality of different wheel cover assemblies customarily offered as standard or optional equipment.

It is another object to provide a novel fastening arrangement maintaining mating surfaces on two members in intimate, non-rattling relationship.

These and other objects, features, and advantages of the invention will be apparent from the following detailed description of a preferred embodiment of the invention, and from the accompanying drawings in which:

FIGURE 2 is a fragmentary rear view of the wheel cover assembly of FIGURE 1;

FIGURE 3 is a cross-sectional view taken on line 3—3 of FIGURE 1; and

Figure 1:
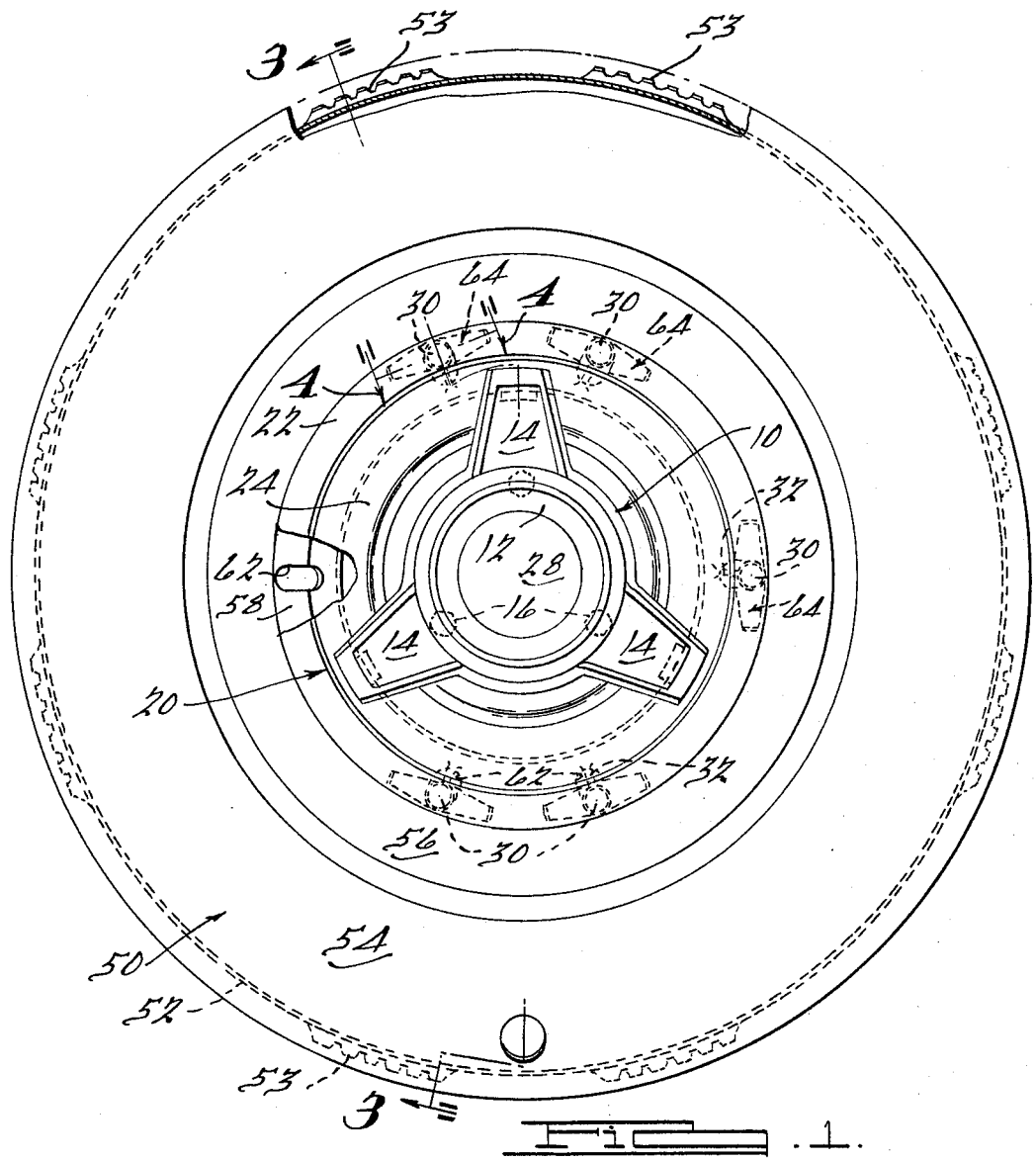
FIGURE 1 is a front view of a wheel cover assembly according to the invention.

The wheel cover assembly of the illustrated embodiment of the invention comprises, broadly, a spinner 10, a dome 20, and a cover ring 50. Spinner 10 and dome 20 are preferably formed as zinc die castings and cover ring 50 as a stainless steel stampling.

Cover ring 50, as best seen in FIGURE 3, includes, working radially inwardly, a rim portion 52 provided with the usual serrated portions 53 for engagement with the wheel rim, a truncated cone portion 54, a more steeply sloping truncated cone portion 56, an annular portion 58, and a truncated inverted cone portion 60.

Dome 20 is generally disk shaped and includes an annular rim portion 22, a truncated inverted cone portion 24, a truncated cone portion 26, and a central disk portion 28.

Spinner 10 includes a hub portion 12 and a plurality of arms 14 (see also FIGURE 1) radiating from hub portion 12.

Spinner 10 is secured centrally to dome 30 by a plurality of self-tapping screws 16 passing through holes provided in disk portion 28 and into blind bores provided in lugs 18 cast integral with spinner hub portion 12.

The invention concerns primarily the manner in which the dome and spinner sub-assembly is secured to the cover ring 50 to form the complete wheel cover assembly.

As best seen in FIGURES 2 and 3, a plurality of peripherally spaced lugs 30 are cast integral with dome 20 and project inwardly (to the right as viewed in FIGURE 3) from the inner face of annular rim portion 22. Each lug is provided with an integral strengthening web 32 joining the lug to the inner conical face of inverted cone portion 24 and each lug has a central blind axial bore 34 opening at its free end.

A plurality of slots 62, corresponding in number and peripheral positioning to the lugs 30, are provided in cover ring 50. An edge portion of dome 20 has been broken away in FIGURE 1 to show the full outline of a slot 62. Each slot begins at a location in annular portion 58 spaced radially inwardly from the outer edge of that portion and extends radially inwardly into inverted cone portion 60. As best seen in FIGURE 3, when the dome-spinner sub-assembly is positioned on the cover ring, the lugs 30 pass through the slots 62 with the web 32 of each lug being accommodated in the portion of the slot in the inverted cone portion 60.

Figure 4:
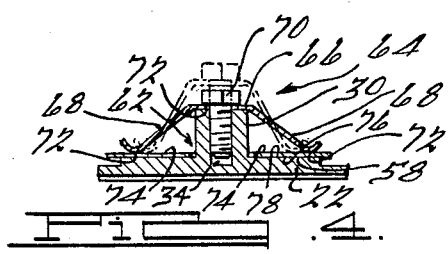
FIGURE 4 is a cross-sectional view taken on line 4—4 of FIGURE 1.

A plurality of leaf spring members 62 are provided for assisting in holding the cover ring and dome in their illustrated assembled relationship. As best seen in FIGURE 4, each spring member 64 is formed as a spring steel stamping and includes a central portion 66 and arm or wing portion 68 at either side of portion 66 bent at an angle to portion 66 to form therewith a member of shallow U shape. As shown in phantom in FIGURE 4, each spring member 64 has a relaxed height or axial extent substantially greater than the length or axial extent of lugs 30.

In the assembly of the wheel cover, with the cover ring and dome in their illustrated assembled relationship, spring members 64 are positioned over the free ends of lugs 30 and a self tapping screw 70 is passed through an aperture 72 in the central portion 66 of each spring member for threaded engagement with the blind bore in the corresponding lug 30.

As the screws are threaded into the lugs, the heads of the screws engage the spring members 64 so that further threading of the screws draws the central portions 66 of the spring members toward the lugs and splays the wing portions 68 outwardly.

With the screws fully threaded into the lugs, the spring members assume the configuration shown by the solid line position of FIGURE 4. In this configuration, bearing surfaces 72, presented by the upturned ends of wing portion 68, are spring pressed against a bearing surface 74 provided by the inner face of the annular portion 58 of cover ring 50 so that the outer annular face 76 of that portion is pressed firmly against the annular inner face 78 of the annular rim portion 22 of the dome. The dome and cover ring are thus held securely together in non-rattling relationship.

The described arrangement enables the dome and cover ring to be securely assembled and yet maintains a relatively thin dimension, desirable for styling considerations, at the outer peripheral edge of rim portion 22. It will also be apparent that cover ring 50, without the slots 62, may receive a medallion disk (not shown) to provide the low line wheel cover. The same cover ring 50 may thus serve as the basic outer unit for both low line and premium wheel covers.

While a preferred embodiment of the invention has been illustrated and described, it will be apparent that various changes may be made without departing from the scope or spirit of the invention as defined by the appended claims.

I claim:
1. A wheel cover assembly comprising:
   (A) a first generally circular member including
      (1) a first relatively thin annular portion presenting at its inner face an annular contact surface concentric with the central axis of said member,
      (2) a second annular portion concentric with said first portion and including at least one relatively thick section extending inwardly to a location beyond the aforesaid contact surface and having a blind bore extending axially therein and opening at the inner face thereof;
   (B) a second generally circular member having an annular portion presenting
      (1) at its outer face, another annular contact surface of the same radius as the aforesaid annular surface for mating coaction with the latter and
      (2) at its inner face, a bearing surface,
      (3) said second member having at least one opening extending therethrough from its outer to its inner face of a size to freely pass said relatively thick section, whereby to bring said contact surfaces together;
   (C) a leaf member including
      (1) a first portion having an aperture therein and
      (2) a second portion presenting a bearing surface; and
   (D) a headed screw member adapted to be passed through said aperture and screwed into said blind bore to engage at its head with said first portion adjacent said aperture and draw said leaf member outwardly, whereby to press the bearing surface on the second portion thereof against the bearing surface on the inner face of said second member and thereby press said annular contact surfaces together in non-rattling relationship.

2. A wheel cover assembly according to claim 1 wherein said second annular portion is disposed radially inwardly of said first portion.

3. A wheel cover assembly according to claim 2, wherein said leaf member comprises a strip of material in U-form with said first, apertured, portion constituting the central portion of the U and each of the legs of the U presenting, adjacent its free end, a bearing surface as aforesaid for coaction with the bearing surface on the second member.

4. A wheel cover assembly according to claim 2 wherein said leaf member is formed of spring material.

5. A wheel cover assembly according to claim 4, wherein said leaf member comprises a strip of spring steel in U-form with said first, apertured, portion constituting the central portion of the U and each of the legs of the U presenting, adjacent its free end, a bearing surface as aforesaid for coaction with the bearing surface on the second member.

6. A wheel cover assembly according to claim 4 wherein said screw member is of the self-tapping type.

7. A wheel cover assembly according to claim 6, wherein said first member is formed as a zinc die casting.

8. A non-rattling assembly of metallic members comprising:
   (A) a first generally circular member having an inner face presenting a contact surface;
   (B) a second generally circular member having
      (1) an outer face presenting a mating contact surface and
      (2) an inner face presenting a bearing surface;
   (C) said first member including a lug portion extending inwardly to a location beyond the contact surface on said inner face;
   (D) said second member having an opening extending therethrough from its outer to its inner face of a size to readily pass said lug portion, whereby to bring said contact surfaces together;
   (E) a leaf member including
      (1) a first portion having an aperture therein and
      (2) a second portion presenting a bearing surface; and
   (F) a headed fastener element having a shaft portion adapted to be passed through said aperture and outwardly into said lug portion to engage at its head with said first portion adjacent said aperture and draw said leaf member outwardly, whereby to press the bearing surface on the second portion thereof against the bearing surface on the inner face of said second member and thereby press said contact surfaces together in non-rattling relationship.

9. A non-rattling assembly of metallic members according to claim 8, wherein said leaf member comprises a strip of material in U form with said first, apertured, portion constituting the central portion of the U and each of the legs of the U presenting, adjacent its free end, a bearing surface as aforesaid for coaction with the bearing surface on said second member.

10. A non-rattling assembly of metallic members according to claim 8 wherein:
   (A) said leaf member is formed of spring material and
   (B) said headed fastener element comprises a screw.

11. A non-rattling assembly of metallic members according to claim 10, wherein said leaf member comprises a strip of spring steel in U form with said first, apertured, portion constituting the central portion of the U and each of the legs of the U presenting, adjacent its free end, a bearing surface as aforesaid for coaction with the bearing surface on said second member.

12. A wheel cover assembly comprising:
   (A) a first generally circular member including
      (1) a first relatively thin annular portion presenting at its axially inner face an annular contact surface concentric with the central axis of said member, and
      (2) a second annular portion concentric with, and radially inwardly of, said first portion and including a plurality of lug portions spaced circumferentially therearound and each extending axially inwardly to a location beyond said annular surface and having a blind bore extending axially therein and opening at the inner face thereof;
   (B) a second generally circular member having an annular portion presenting
      (1) at its outer face, another annular contact surface of the same radius as the aforesaid annular surface for mating coaction with the latter and
      (2) at its inner face, a bearing surface,
      (3) said second member having a plurality of openings therein spaced circumferentially therearound to freely pass said lug portions and allow said contact surfaces to be brought together;
   (C) a plurality of leaf spring members each including
      (1) a first portion having an aperture therein, and
      (2) a second portion presenting a bearing surface; and
   (D) a plurality of headed screws each adapted to be passed through the aperture in the aforesaid first portion of a respective spring member and screwed into the blind bore in the respective lug portion to engage at its head with said first portion adjacent said aperture to draw said spring member outwardly, whereby to press the bearing surfaces on the second portions of said spring members against the bearing surface on the inner face of said second member and thereby press said annular contact surfaces together in non-rattling relationship.

13. A wheel cover assembly according to claim 12, wherein said second member comprises a stainless steel stamping, said first member comprises a zinc die casting, and said screws are self-tapping.

References Cited by the Examiner
UNITED STATES PATENTS

| | | | |
|---|---|---|---|
| 2,698,768 | 1/1955 | McLeod | 301—37 |
| 2,709,114 | 5/1955 | Plotkin | 301—37 |
| 2,902,316 | 9/1959 | Black | 301—37 |
| 3,145,062 | 8/1964 | Judd | 301—37 |
| 3,173,228 | 3/1965 | Roberts | 52—467 X |

BENJAMIN HERSH, *Primary Examiner.*

LEO FRIAGLIA, *Examiner.*

R. J. JOHNSON, *Assistant Examiner.*